United States Patent
Gamble

(10) Patent No.: US 7,068,776 B1
(45) Date of Patent: Jun. 27, 2006

(54) METHOD AND SYSTEM FOR ROUTING CALLS TO DESIRE DISCOUNT TELEPHONE SERVICES

(76) Inventor: Oliver W. Gamble, 436 E. 75th St., New York, NY (US) 10021

( * ) Notice: Subject to any disclaimer, the term of this patent is extended or adjusted under 35 U.S.C. 154(b) by 0 days.

(21) Appl. No.: 09/552,711

(22) Filed: Apr. 19, 2000

(51) Int. Cl.
H04M 11/00 (2006.01)
H04M 15/00 (2006.01)
H04M 15/06 (2006.01)
H04M 3/00 (2006.01)

(52) U.S. Cl. .......................... 379/355.05; 379/100.14; 379/114.12; 379/142.13

(58) Field of Classification Search .......... 379/144.01, 379/88.23, 111, 130, 100.04, 205.01, 355.05, 379/132, 201, 100.14, 114.12, 201.01, 211.01, 379/142.13
See application file for complete search history.

(56) References Cited

U.S. PATENT DOCUMENTS

| 3,749,847 A * | 7/1973 | Piacente et al. ............ 379/200 |
| 4,506,116 A | 3/1985 | Genest ........................ 379/90 |
| 4,737,981 A | 4/1988 | Hoberman et al. ......... 379/112 |
| 4,893,335 A | 1/1990 | Fuller et al. ................ 379/200 |
| 4,924,512 A * | 5/1990 | Sizemore et al. ........... 379/445 |
| 5,054,059 A * | 10/1991 | Stern et al. ................. 379/200 |
| 5,086,456 A * | 2/1992 | Shizawa et al. ............ 379/132 |
| 5,375,161 A | 12/1994 | Fuller et al. .................. 379/57 |
| 5,471,524 A | 11/1995 | Colvin et al. ............... 379/200 |
| 5,555,100 A | 9/1996 | Bloomfield et al. ........ 358/402 |
| 5,559,611 A | 9/1996 | Bloomfield et al. ........ 358/407 |
| 5,583,933 A | 12/1996 | Mark .......................... 379/355 |
| 5,638,433 A * | 6/1997 | Bubien et al. .............. 379/130 |
| 5,689,557 A * | 11/1997 | Kaplan ................... 379/355.05 |
| 5,732,133 A | 3/1998 | Mark .......................... 379/355 |
| 5,809,126 A | 9/1998 | Smith et al. ................ 379/200 |
| 5,818,930 A | 10/1998 | Mark .......................... 379/444 |
| 5,881,139 A * | 3/1999 | Romines ..................... 379/130 |
| 5,883,964 A * | 3/1999 | Alleman ................. 379/205.01 |
| 5,898,763 A * | 4/1999 | Azuma et al. ......... 379/100.04 |
| 6,035,027 A * | 3/2000 | Alleman ................. 379/205.01 |
| 6,118,858 A * | 9/2000 | Kang et al. ................. 379/111 |
| 6,385,308 B1 * | 5/2002 | Cohen et al. ............ 379/88.23 |
| 6,404,869 B1 * | 6/2002 | Henderson et al. .... 379/144.01 |

* cited by examiner

Primary Examiner—Ahmad F. Matar
Assistant Examiner—Hector A. Agdeppa

(57) ABSTRACT

A method and system for automatically completing long distance, international and local telephone calls using a preselected discount telephone service. A R.A.T. sensor array monitors a telephone line for activity. When the dialing of an outgoing call is detected, a central processing unit, in conjunction with a DTMF decoder, determines whether the call being made is a discount call by detecting whether predetermined positioned digit(s) is a predetermined number or set of numbers. If the number dialed is a discount call, the DTMF generator dials a predetermined prefix and/or access code resulting in completion of the call at a discounted rate.

73 Claims, 7 Drawing Sheets

RINGING

ANSWER

DIALING

METHOD AND SYSTEM FOR ROUTING CALLS TO DESIRE DISCOUNT TELEPHONE SERVICES

FIELD OF THE INVENTION

The present invention relates generally to a method and system for completing telephone calls over a network and more particularly to a method and system for completing such calls using a preselected discount service.

BACKGROUND OF THE INVENTION

Because telephone service is largely a commodity, consumers often select a calling plan that will result in the least expensive bill at the end of each payment period. As a result, many telephone companies attract and/or maintain its customers by offering a variety of service plans. The plan offerings are usually in the form of per minute rates (sometimes with a monthly fee) and may vary based on other factors, such as the time of day that the call is placed, the length of the individual telephone call, the total amount of time associated with the user's outgoing calls, etc. Customers usually try to get the service that best suits their needs at the lowest rate.

In addition to these basic telephone service plans, many companies offer its customers a service called "dial arounds." Dial arounds are prefixes (such as "10-10-321" or "10-10-345") that telephone users may dial which enable them to bypass (or dial around) their preselected long distance carrier. Technically, the prefix serves as a "carrier access code" that enables local telephone carriers to identify and reroute calls to other telephone companies. The dial-around service charges may appear on the telephone bill provided by the local telephone company, just as the charges for the selected long-distance carrier are reported.

In addition to the discounted long distance services and the dial around services described above, companies, by utilizing the internet are enabling users to recognize discounted rates when making telephone calls. Some internet telephone companies, for example, are offering discounted long distance service for under five cents per minute.

Although telephone users desire to take advantage of these discounts, the large number of options available to these consumers makes choosing such a service confusing. Moreover, many consumers often refrain from using such services because most of these discount services require the user to remember and enter a complex multi-digit code (in addition to the actual area code and recipient telephone number) to place a telephone call. For example, the dial arounds often require that a seven digit prefix or access number (in addition to a user identifier access code which may or may not be required) be dialed prior to dialing the eleven digit long distance telephone number. Further, completing a long distance telephone call utilizing one of the existing internet telephone company services often requires that an access telephone number and user identifier be dialed prior to dialing the intended telephone number. Thus, eighteen to thirty numbers or often more may be required to complete a discounted long distance telephone number. Consumers' inability or indifference to remember such prefixes or access telephone numbers results in decrease usage of such services.

In addition to the difficulty in remembering such prefixes and/or access numbers, telephone users often wish to spare themselves of other disadvantages associated with using such services. For example, a telephone user has a greater chance of dialing an incorrect number when as many as twenty seven, and sometimes more, numbers must be entered to place a telephone call. Also, the speed in which a caller is connected to the recipient is reduced when these additional numbers must be entered. Finally, some consumers are embarrassed to use, or to request that other users of their telephone use, such discount services, particularly in light of the hindrances discussed above.

SUMMARY OF THE INVENTION

Accordingly, an improved system and method are required which will allow telephone users to take advantage of the discounted services available when making discount calls (long distance, international and local calls) while avoiding the disadvantages discussed above. The method and system of the invention satisfies that problem. According to one embodiment, the invention enables consumers to take advantage of one or more of the available discount services when making long distance telephone calls while not having to remember or enter the additional digits typically required to effectuate such calls. Moreover, the speed and accuracy in making such calls are likewise not affected.

This is accomplished by utilizing a device that automatically completes long distance telephone calls using a preselected long distance service. A R.A.T. sensor array monitors the telephone line for activity. When the dialing of an outgoing call is detected, a stamp, in conjunction with a DTMF (Dual Tone Multi-Frequency) transceiver, determines whether the call being made is long distance, international or local by detecting whether a predetermined positioned digit(s) is a predetermined number or series of numbers. If the number dialed is a long distance, international or local call, the central processing unit effectuates the isolation of the telephone and captures the dialed telephone number, and a DTMF generator dials a predetermined prefix and/or access code to access the discount long distance carrier, and then the telephone number, and the de-isolation of the telephone, resulting in the placing of the call at a discounted rate.

DETAILED DESCRIPTION

System of the Invention

Figure 1:
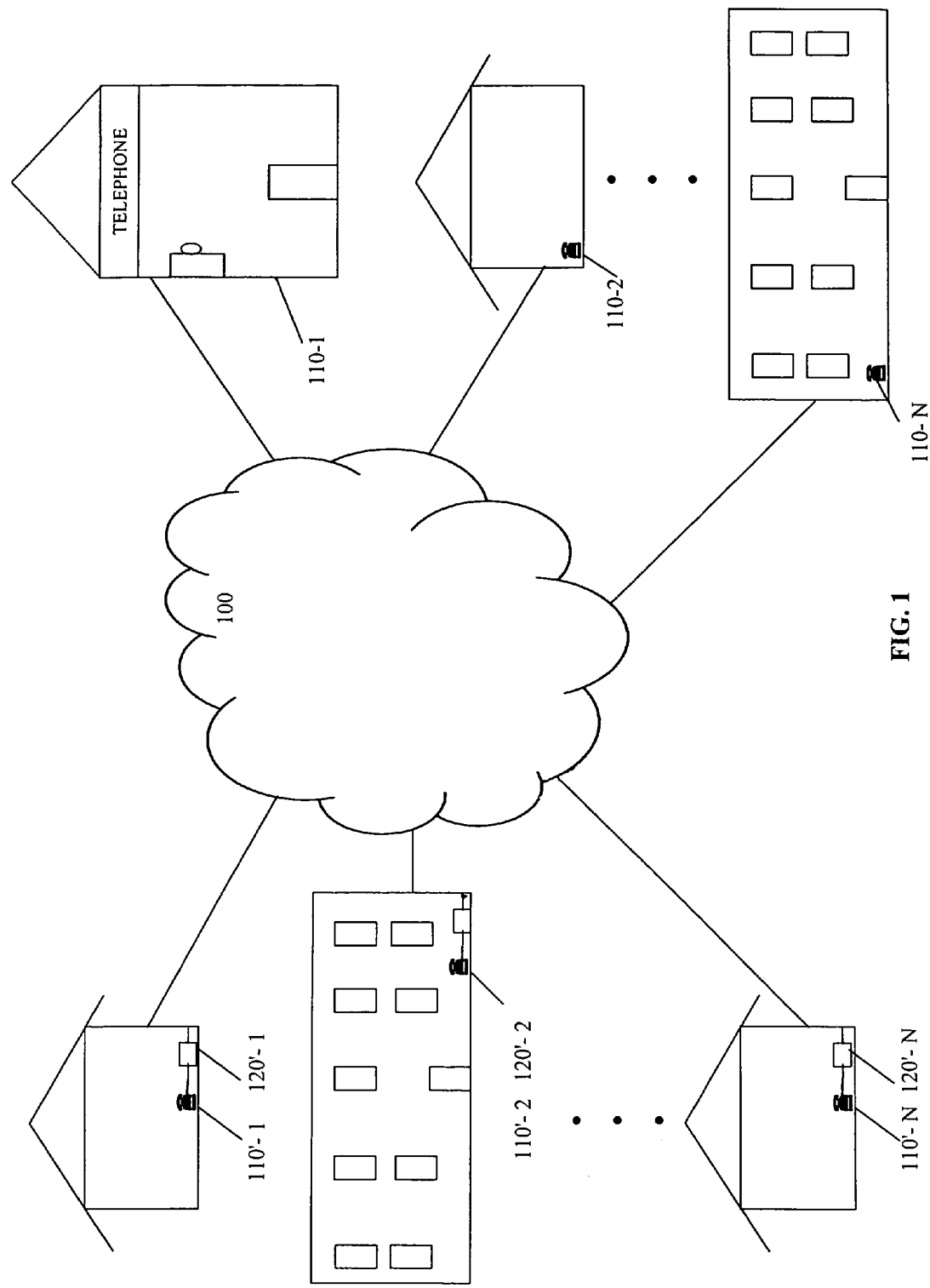
FIG. 1 illustrates a system according to one embodiment of the current invention.

FIG. 1 shows one embodiment of a system incorporating the present invention. In this embodiment, the system includes telephones or user interface devices 110 and 110'. Although the interface user device, in one embodiment, is a telephone, in an alternate embodiment, user interface devices 110 and 110' may be a facsimile, computer, online access device, voice response unit or the like. It should be noted that although references are made herein to telephones and user interface devices, these terms are used interchangeably and may include the other user interface devices listed above, as well as those that are not listed herein, that utilize telephony services to effectuate communication over network 100. It should be noted that the difference between user interface devices 110 and 110' is the devices' connection with automatic router 120 which is described in detail below (i.e., 110' denotes that the device is connected to router 120, while 110 has no such router 120 connected to it).

As shown in FIG. 1, user interface devices or telephones 110 and 110' are connected to a network 100. Network 100 in one embodiment is a public switched telephone network (PSTN). In an alternate embodiment, network 100 may be the internet, world wide web or any network capable of effectuating long distance telephony communications between users. The network enables any one of the interface user devices 110 and/or 110' to be in communication with any of the other user interface devices 110 and/or 110'.

As shown in FIG. 1, some of the interface user devices 110 are connected to an automatic router 120 which may be situated between the telephone 110 and the port (i.e., wall socket) into which the telephone 110 is plugged. As will be described below with reference to FIGS. 3–5, router 120 enables users having such device to automatically make discount telephone calls (or telephone calls). It should be noted that while telephone 110 and automatic router 120 are shown as two separate devices, router 120 may be attached to, located within, or otherwise in communication with telephone 110. Finally, although users seeking to utilize discount long distance services are typically residential or non-commercial users, the scope of the system and method described herein are not limited to such use. Thus, the method and system described herein may include residential telephone users as well as commercial telephone users. Finally, it should be noted that the method and system described herein enable users to recognize discounts when placing potential discount calls. Discount calls are defined as long distance or international calls, and, in some cases, local calls. Because long distance carriers offer local telephone service, and vice versa, a discount telephone service provider may offer discounted service for international service calls, long distance calls, local calls, or any combination of these call types.

Automatic Router

Figure 2:
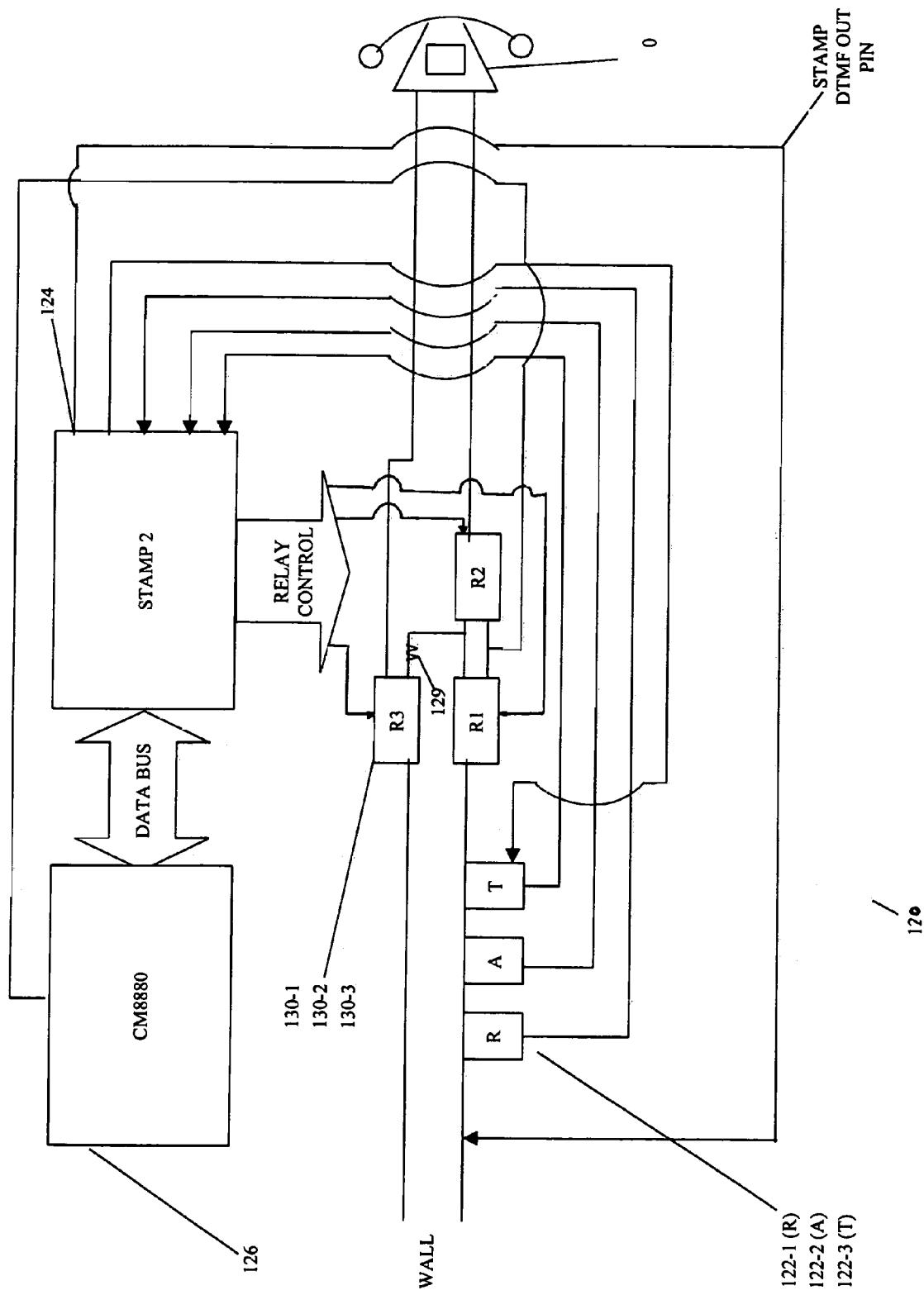
FIG. 2 illustrates one embodiment of the router used in the system shown in FIG. 1.

FIG. 2 illustrates one embodiment of the router 120 used in the system shown in FIG. 1. The main components of the automatic call router 120 are a sensor array 122, relays 130, stamp 124 (containing a microprocessing unit, EEPROM, clock and RAM memory), DTMF (Dual Tone Multi-Frequency) decoder and encoder chip 126, a 2 kilo-ohm@5 watt resistor 129, voltage regulator and a power supply. The automatic call router 120 will be interposed between and in communication with the telephone or user interface device and the network as shown in FIGS. 1 and 2.

The sensor array 122 may consist of the following three sensors: ring sensor 122-1, an answer/off hook sensor 122-2, and a time out sensor 122-3. These sensors will be termed the R.A.T. for ringing, answering incoming call/off hook status of phone, and time out.

The ringing sensor 122-1 comprises an alternating current optoisolator coupler. The coupler may be attached to the phone line by a reverse facing diode, allowing only negative current to flow through the diode and the trigger of the coupler. Ringing is a process that employs both positive and negative moving current. The reverse facing diode allows only the negative current to reach the coupler. The light emitting diode inside the coupler, in one embodiment, activates a photo-transistor. The photo-transistor allows current to flow through it to a pin on the microprocessor. The microprocessor detects the current as a high signal, indicating ringing of the phone.

The answering/off hook sensor 122-2, comprises an alternating current optoisolator coupler. The coupler is attached to the phone line by a forward facing diode, allowing only positive current to flow through the diode and trigger the coupler. When the phone 110 is off the hook, current flows through the phone line to the coupler. The light emitting diode inside the coupler activates a photo-transistor. The photo-transistor allows current to flow through it to a pin on the microprocessor. The microprocessor detects the current as a high signal, indicating the off hook status of the phone.

The time-out sensor 122-3, in one embodiment, is comprised of an alternating current optoisolator coupler and a triac. The coupler is attached to the phone line with leads coming from both the ring and answering sensors. When the phone 110 is off the hook, current flows through the phone line to the coupler. The light emitting diode inside the coupler activates a photo-transistor. The photo-transistor allows a signal current to flow through it to a pin on an optoisolator triac. The triac is activated by a signal from the microprocessor. The phone line signal is directed to the relays. The microprocessor sends a one time activation signal to the triac after it has determined that the phone 110 is off the hook to make an outgoing phone call. This late activation prevents the time-out sensor from falsely reading the ringing or answering incoming call. While the phone is off the hook, the triac will pass a current through a phototransistor to the microprocessor. The triac will continue to pass current and maintain the high pin state until a circuit break occurs, resulting in a momentary drop in current (and voltage) followed by a resumption of current (and voltage). The microprocessor sends a signal to activate the triac each time the power flowing through it is momentarily halted. The high signal on the time-out pin is turned off. This continues until the triac is reactivated. The triac is activated once per outgoing telephone call. The absence of a high on the pin attached to the triac indicates expiration of the allotted time.

The optoisolator couplers employed, in one embodiment, is part number H11AA814AQT-ND or H11AA814QT-ND manufactured by Optoelectronics. The optoisolator triac may be part number MOC3010QT-ND also manufactured by Optoelectronics. Of course, other components and/or configurations may be used for accomplishing such monitoring.

The relays 130 used in one embodiment of the router 120 have both a normal close circuit and a normal open circuit. The application of a current to the coil will cause the normally open circuit to close, and the normally closed circuit to open. The default state (no power applied to the coil) allows a telephone call to pass through the automatic call router 120. When a current is applied to the coils of relay 1 (R1) 130-1 and relay 2 (R2) 130-2, an alternate path is opened, one that routes the phone line to the DTMF encoder/decoder 126. This re-routing of the phone line allow the microprocessor to monitor/read DTMF tones originating from the phone 110. The microprocessor initiates the monitoring for DTMF tones whenever it detects an outgoing call via the sensors 122. The signal from the microprocessor activating the relay designated relay 2 (130-2) also activates an optoisolator linking the phone line to a common ground, enabling the microprocessor to read the DTMF digits. The microprocessor activates the third relay (R3) 130-3 when it detects a one ("1") as the first DTMF position passing down the telephone line. Although detection of the number "1" as the first DTMF position activates relay 3 (130-3) and deactivates relay 1 (130-1) in the present embodiment, different number(s) and/or different DTMF position(s) may activate relay 3 (130-3) and deactivates relay 1 (130-1). Once relay 130-3 is triggered and relay 130-1 is deactivated, the phone 110 is isolated, and the phone line is seen as being busy to the outside world.

The signal that activates the third relay 130-3 may also activate an optoisolator. This optoisolator provides power needed to allow the phone 110 to continue functioning. When relay 3 (130-3) is activated, a 2 kilo-ohm resistor which is connected across the incoming line from the wall enables the system to emulate that the phone 110 is busy. In one embodiment, the relays 130 used are part # G6E-134P-ST-US-DC5 made by Omron. Of course, other components and/or configurations may be used for accomplishing such control over the telephone line wiring.

A stamp 124 is employed by router 120 and comprises a PIC-micro-controller chip (microprocessor), PBasic interpreter chip (software language use to program the micro-controller), EEPROM (electrically erasable programmable read only memory), RAM (Random Access Memory), clock and ports through which information and instructions can be passed. In this embodiment these ports are called pins, and each pin may be in either a high or low state. The micro-controller uses the state of the sensor pins to monitor the phone line for activity. The sensors 122 are attached to specific pins on the micro-controller, and when these pins go high or low, the micro-controller via the program store in its memory, can determine what is happening. The micro-controller is able to detect an active phone state by monitoring the pin connected to the "A" (answer/off hook sensor). The relays 130 used in the router 120 are attached to specific pins of the micro-controller. The micro-controller recognizes which pin is attached to which relay 130, and the program tells the micro-controller when each relay should be employed. The micro-controller can activate a specific relay by outputting a small voltage to the pin attached to that relay coil. When the pin goes high the relay 130 is activated, and when the pin goes low the relay 130 is deactivated. In one embodiment a stamp II 124 manufactured by Parallax Inc./Microchip Technology (part # PIC 16C57) is used. Of course, other components and/or configurations may be used for accomplishing such control and monitoring of telephone line activity.

The CM8880 126 is a fully integrated DTMF transceiver. This transceiver 126 may be interfaced with a computer/microprocessor to detect and interpret DTMF signals. The transceiver 126 is attached to the telephone 110 via the alternate path created when the relay 1 (130-1) and relay 2 (130-2) are activated. By placing the transceiver 126 connection on the alternate path of the phone line, it is protected from the high voltage of a phone ringing. The phone ring consists of both forward and backward flowing (AC) current at a voltage level that could otherwise damage the transceiver 126.

Once the microprocessor detects an outgoing call state, it triggers the relays 130 that bring the transceiver 126 in contact with the phone line. This will enable the transceiver 126 to interpret the DTMF tones on the phone line, and pass it to the microprocessor. Although the current embodiment employs a CM8880 DTMF transceiver made by California Micro Devices (part # CM8880PI), other components and/or configurations may be used for accomplishing such decoding and encoding of DTMF.

A standard 9 volt and a standard 5 volt regulator may be employed as a power source for the router 120. The 5 volt supply may be used to power the DTMF transceiver 126, the relays 130, the sensors 122 to signal the microprocessor and the stamp 124. The 9 volt source powers the isolated telephone 110. The 5 volt and 9 volt regulators used by the router 126 may be, in one embodiment, Japan Radio Company part # NJM7809-FA and NJM7805-FA, respectively. Of course, other components may be used for accomplishing such regulation of voltage.

Automatic Routing Process

The process of automatic router 120 may be segmented into three functions: (1) monitoring the telephone line for activity; (2) detecting whether a potential discount telephone call is placed; and (3) placing such call at a discounted rate when such rate is available. These processes are described below in detail with reference to FIGS. 3–5 as well as the components illustrated in FIG. 2.

Phone Line Monitoring Process

The phone lines between the wall and the telephone 110 may be comprised of two wires. In one embodiment, the optoisolator of the "A" (answer/off hook) sensor 122-2 and "R" (ringing) sensor 122-1 are arranged in parallel with the telephone 110 red wire coming from the wall socket. The optoisolator of the time out sensor 122-3 is arranged in series with "A" (answer/off hook) sensor 122-2 and "R" (ringing) sensor 122-1. This allows the phone line activity to power the sensors. The optoisolator coupler of the time-out sensor 122-3 is connected to Relay 1 (130-1). Relay 1 is connected to relay 2 (130-2), and relay 2 is connected to the telephone 110. Relay 3 (130-3) is attached to the other wire in the line coming in from the wall and going to the phone 110. In this embodiment relay 3 (130-3) is attached to the green wire. The sensors are attached to the red wires.

Referring to FIG. 3, the automatic router 120 uses a sensor array 122 to monitor the telephone line for activity (i.e., ringing of the phone, answering an incoming call, or initiating a outgoing call) (steps 305 and 310). In FIG. 2 the sensor array 122 is denoted as 122-1 (ring), 122-2 (answer/off hook), and 122-3 (time out)—R.A.T.

The "A" (answering/off hook) sensor 122-2 is connected to the stamp 124 at a pre-determined pin. While this pin remains in a low state, the stamp 124 recognizes that the phone 110 is still on the hook (phone is inactive). The telephone 110 is considered active when it is ringing, being answered, or being used to make an outgoing call. When the phone is active the pin for the "A" (answer/off hook) sensor 122-2 is high.

Figures 5A, 5B, 5C:
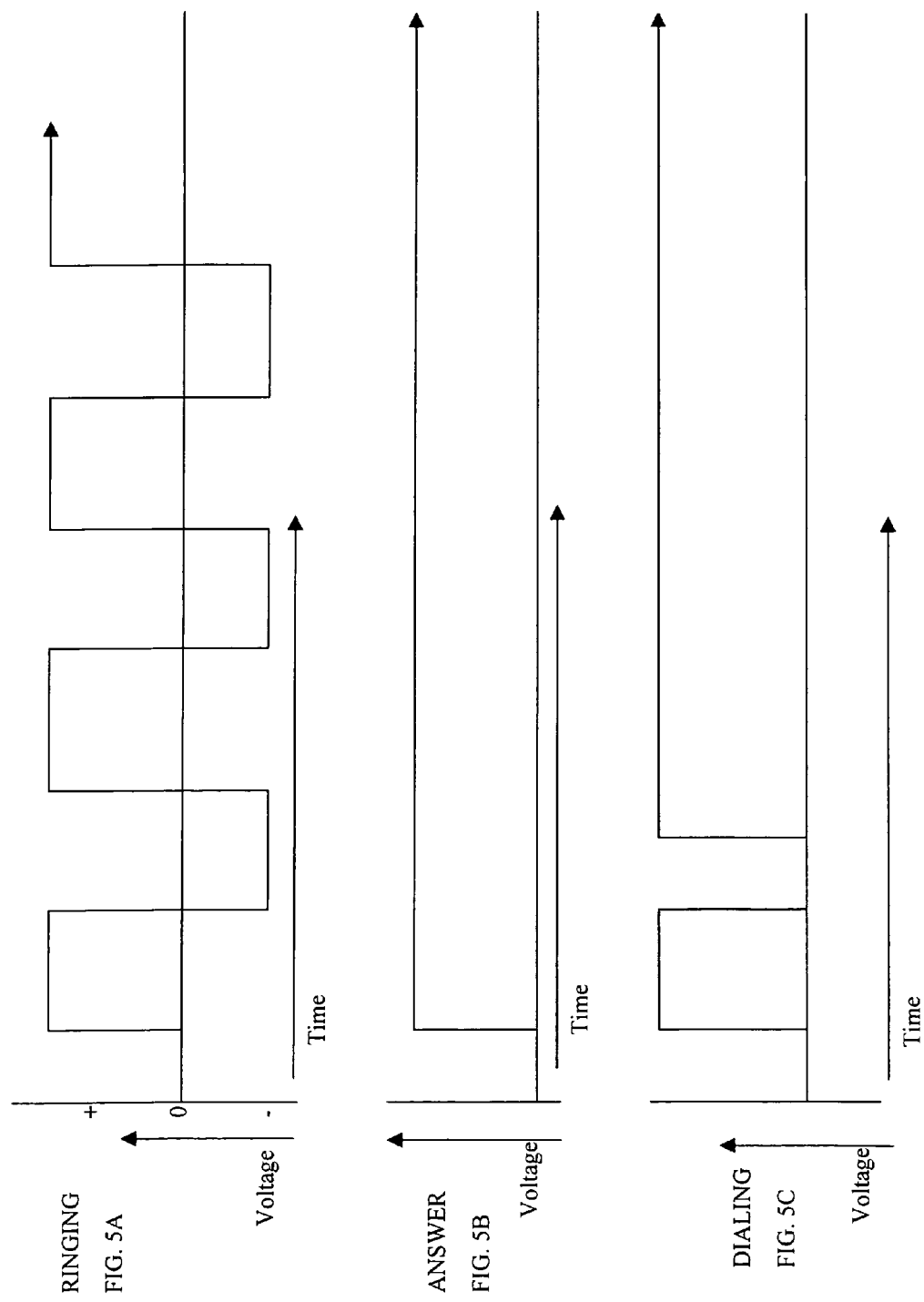
FIG. 5 is a chart illustrating the various signals detected by the automatic router shown in FIG. 2 as it monitors the phone line for activity.

Upon detecting a high state on the "A" (answer/off hook) sensor pin, the stamp 124 utilizes software to determine the exact nature of the phone active state. The stamp 124 briefly polls the pins for both the "R" (ringing) and "A" (answering) phone sensors. A polling cycle may vary, for example, from 0.3 to 0.6 seconds. The stamp 124 monitors the telephone line for activity that is specific to each of the three possible activities (FIG. 5). If the active state is the result of a ringing condition, the alternating (negative and positive flowing) current will appear as only the bottom portion of FIG. 5A. The reverse diode allows only the negative portion of the ring pattern to be detected. The pattern continues as long as the phone is ringing, and the stamp 124 experiences a series of periodic highs on the "R" (ring) sensor pin.

If the active state is the result of an incoming call being answered, the stamp 124 detects a pattern similar to FIG. 5B, and the "A" (answer/off hook) sensor 122-2 goes high and remains high until the telephone call is over. If the "A" (answer/off hook) sensor 122-2 is high because of an outgoing call, the stamp 124 detects a pattern similar to FIG. 5C. As FIG. 5C illustrates, a brief pause in the flow of current through the "A" (answer/off hook) sensor 122-2 is recognized. After the brief pause, the current will resume to flow and continue to flow until a time out occurs. A time-out is defined as a condition in which the phone company has determined that the phone 110 has been off the hook for a predetermined period of time and no valid phone number has been entered. When this occurs, the phone company may interrupt the calling process with a message instructing the caller to please hang-up and try again. In this embodiment, such message is termed the "time out message."

When the stamp 124 detects a high on the "A" (answer/off hook) sensor 122-2 pin, it briefly polls both the "A" (answer/off hook) sensor 122-2 and "R" (ring) sensor 122-1 for status. If a high on the "R" (ring) sensor 122-1 is detected, a ring-flag is changed from "0" to "1" in the software. The stamp 124 likewise changes the call-flag from "0" to "1" if the high on the "A" (answer/off hook) sensor pin is briefly interrupted. The stamp 124 continues the polling process until it no longer detects a high on the "R" (ring) sensor 122-1 during a polling cycle. Upon detecting a high on the ring sensor, the stamp 124 will restart the polling cycle. Once the ringing stops, or if no ringing is detected within a polling cycle, the stamp 124 polls the "A" (answer/off hook) sensor 122-2 to determine the "call-flag" status. If the call-flag has a value of "1", and the ring-flag has a value of "0", and the "A" sensor is high, then the stamp 124 recognizes that the call is outgoing. If the ring-flag has a value of "1" and the call-flag has a value of "0", and the "A" sensor is high, then the stamp 124 recognizes that the call is an answered incoming call. For a summary, see Table 1 below.

TABLE 1

| Ring-Flag | Call-Flag | Answer/Off Hook Sensor Status | Meaning |
| --- | --- | --- | --- |
| 1 | 0 | Low | Phone Ringed But Not Answered |
| 1 | 0 | High | Answer Incoming Call |
| 0 | 1 | High | Outgoing Call |
| 1 | 1 | High/Low | Phone is Ring |

The stamp 124 considers the "A" (answer/off hook) pin going low and remains low at the completion of an active event. The stamp 124 resets itself and goes back to polling the phone line for activity. In one embodiment, the "A" (answer/off hook) pin goes low and remains low once the call is completed and the phone is placed back on the hook.

If an outgoing call is being made, the router 120 will determine the nature of the call by looking, for example, for a "1" in the first position of the phone number being dialed. The absence of a "1," unless discounted local service is available, places the router 120 in a passive mode, and allows the phone call to occur but not to perform its routing function. The presence of a "1" in the first position of the phone number being dialed triggers the router 120 into performing its specialized function (routing the call) as described more fully below. Other series of numbers may be used to trigger router 120. For example, the router 120 may be configured to trigger all calls beginning with "011", or all eleven digit telephone numbers beginning with "1" less 1800, 1888, telephone numbers and the like, or all "9011", or "91" twelve digit phone numbers (usually dialed to gain long distance or international access in settings such as offices or hotels).

Long Distance Call Detection and Router Response Process

Although the system and methods may be configured for all types of telephone service, the process of detecting and routing long distance calls will now be described Referring back to FIG. 3, once an outgoing telephone call is detected in step 315, stamp program determines whether the outgoing telephone call being placed is a long distance call. It should be noted that when an off-hook condition exists but the call is not an outgoing call, the monitoring process for an outgoing call is restarted at the end of the off-hook condition (step 320).

In step 321, the stamp 124 and DTMF decoder 126 determine whether a DTMF tone is detected prior to a time out condition (step 319). If a time out condition is detected, the relays are released (step 334) and the process restarts once the phone is on hook (step 335).

If time-out has not occurred, the stamp 124 will start counting the DTMF signal detected. With each detected DTMF signal, the count is advanced. A determination is then made in step 323 as to whether the number of DTMF tones detected is greater than one. If it is not, the stamp 124 checks the first DTMF detected to see if it is equal to the dialed number one (step 325). The detected DTMF is stored in memory. If the first DTMF is a one, the long distance flag (L-Flag) is changed to a one from a zero, and the telephone 110 is isolated from the outside world. The router 120 then returns to step 319 for detecting and collecting additional DTMF tones. When, however, the count is equal to one and the dialed digit generates the DTMF tone corresponding to the number one, the phone is isolated (step 327) and a long distance call is indicated (step 329). The counter is updated with each new DTMF detected. All DTMF signals are stored in memory (step 333) and the router returns to the DTMF detection/capture state.

If the count is greater than one (step 325) and no long distance call is indicated (step 336), the router 120 waits until the phone is on the hook (step 375) before monitoring the phone line again (step 305–310).

The presence of a "1" in the first, or in a predetermined position of the phone number being dialed informs the router 120 that the call is a long distance call. In one embodiment, the router 120 will be monitoring the first position of the dialed telephone number. When the router's microprocessor detects a "1" in the first position of the phone number being dialed, the router 120 assumes an active mode. In the active mode, the router 120 activates relay 3 (130-3) and de-activates relay 1 (130-1), effectuating the isolation of the telephone 110 from the outside world. The internal power source needed to keep the phone 110 functioning is also turned on. The phone 110 uses the power to run its internal DTMF generator enabling the caller to dial their desired phone number.

The DTMF transceiver attached to the telephone line, along the alternate path created by relay 1 (130-1) and relay 2 (130-2) activation (FIG. 2 between 122-1 and 122-2), captures all dialed DTMF digits and pass them on to the microprocessor. The telephone numbers dialed by the user are captured and stored in the microprocessor RAM memory. While the dialed phone number is being captured, the microprocessor is periodically monitoring the "T" (time out) sensor. Once the microprocessor has captured the required number of DTMF digits to initiate the call it will check the first four digits. The first four digits will tell the router 120 if it should route the call to a discount carrier.

If the caller has dialed a special number such as 1(888), 1(800), 1(900), or 1(600) the router coding effectuates the dialing of the "balance" of the phone number that the user entered and then releases the relays 130. Releasing the relay will reconnect the telephone 110 to the outside world. The term "balance" refers to the condition in which a "1" was dialed before the telephone was isolated from the outside world. Therefore, to complete the call, the router 120 will only have to dial all the entered DTMF digits except the first "1". If the caller did not dial a special phone number, the router dials the "modify balance" of the number and releases the relays 130. In "modify balance" of the number, refers to the condition in which a "1" was already dialed before the telephone was isolated from the outside world. In "modify balance" mode, the router 120 dials the discount number without including the starting "1" when dialing the customer long distance number: for example, 1010-321 1(201)123-1234 would be 010-321 1(201)123-1234; and 1(800)7654321 would be 8007654321. If the long distance carrier requires an access code, the router 120 provides such code. The router 120 waits for the "A" (answer/off hook) sensor pin to go low and remain low before concluding that the call is over, and returns to monitoring the phone line for activity. It should be noted that the router 120 may be reconfigured/programmed such that any individual or series of digits and/or any predetermined positioning of such digit may trigger the discount long distance call placing process. For example, if the router 120 is being used in an office building, hotel or some other location where a "9" is dialed prior to placing outside call, the router 120 may be set (i.e., via a switch access by the user) so that the second position digit is detected for the number "1". If in the process of capturing the long distance telephone number being dialed by the user the "T" (time out) sensor 122-3 should go low (indicating the call can not be completed), the router's microprocessor releases the relays 130 allowing the user to hear the time out message. The microprocessor then waits until the "A" (answer/off hook) sensor 122-2 goes low before resetting the system and monitoring the telephone line for activity.

Returning to FIG. 3, if in step 336, a long distance call is indicated, DTMF tones are stored in memory (step 338) and a determination is made as to whether all of the numbers have been captured (step 342). If all of the numbers have not been captured, a determination is made as to whether a time-out condition has occurred (step 376). If such a condition has not occurred, the router 120 resumes detecting and collecting DTMF signals (step 319). If a time-out condition is sense in step 376, the relays are released (step 377) and the router 120 waits for an on hook condition (step 378) which restarts monitoring of the phone line (steps 305–310).

Discount Long Distance Call Placing Process

If long distance call has been detected (step 336) and all of the numbers have been captured (step 342), router 120 dials the access number for the discount supplier (step 345), provides the access code (if required) (step 350) and dials the telephone number entered by the user (step 355). The relays are then released (step 360), reconnecting the telephone 110 to the outside world allowing communication to occur. An end of call condition is then monitored (steps 365 and 370) upon which the router 120 returns to monitoring of the phone line (steps 305–310).

In certain cases, such as when the telephone user is accessing its dial around service from home, the access code may not be required by the discount long distance carrier. In those cases, the access code is not provided. The appropriate number and code may be, in one embodiment, chosen from a plurality of such numbers and codes in accordance with a predetermined protocol. For example, software may enable router 120 to choose a certain access number/code when such number/code is the most cost-efficient. In another embodiment, the stored access numbers/codes may be utilized on a rotating basis so that the subscribing long distance companies can benefit equally from use of its service while the customer continues to recognize savings associated with the discounted services.

Again, it should be noted that router 120 may be reconfigured such that any individual or series of digits and/or any predetermined positioning of such digits may trigger the discount long distance call placing process. For example, the router 120 may be programmed such that if the DTMF encoder/decoder chip 126 of router 120 senses that the first three number are "011" (or first four numbers are "9011" where "9" is required for an outside line), then an international call is being made. Accordingly, router 120 may be programmed with the appropriate discount international call access numbers in order to apply discounted rates to these calls as well. Once the predetermined sensing is accomplished, the discount long distance call placing process may be effectuated.

Discount Long Distance/International Call Dialing Process

Figure 3A:
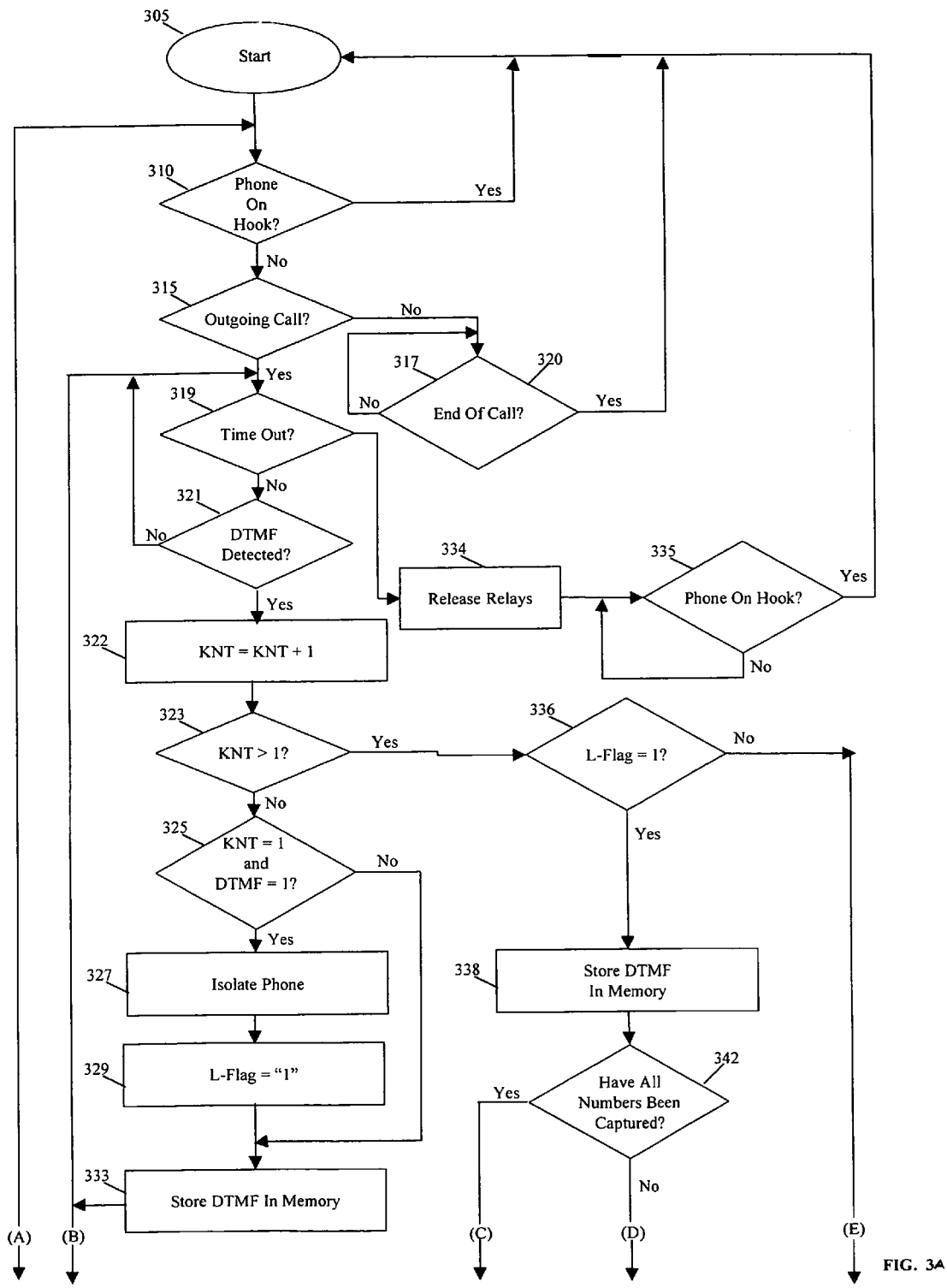
FIGS. 3A and 3B are flowcharts showing telephone line monitoring, discount call detection and call completion processes performed by the router shown in FIG. 2.
Figure 3B:
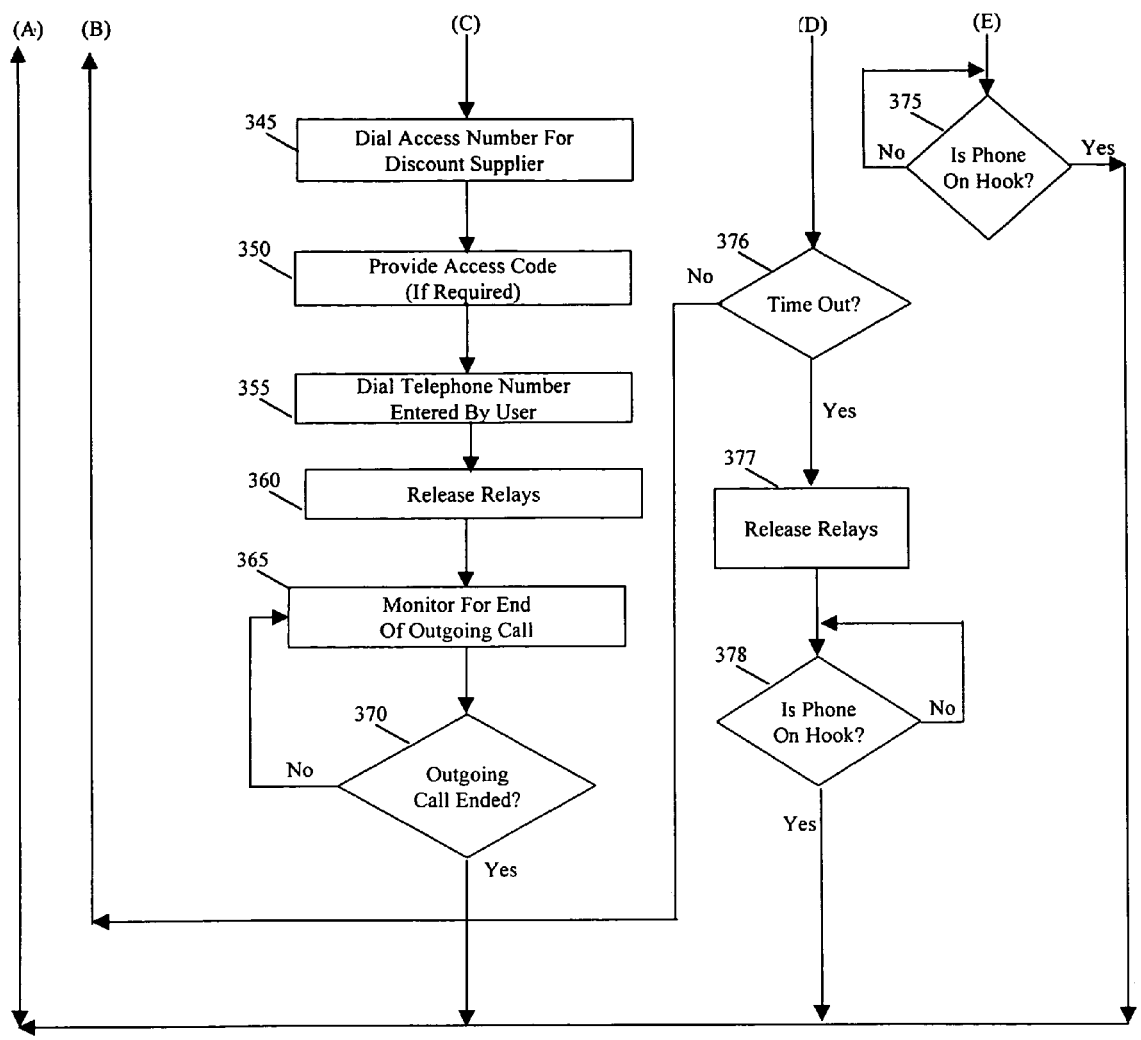
Figure 4A:
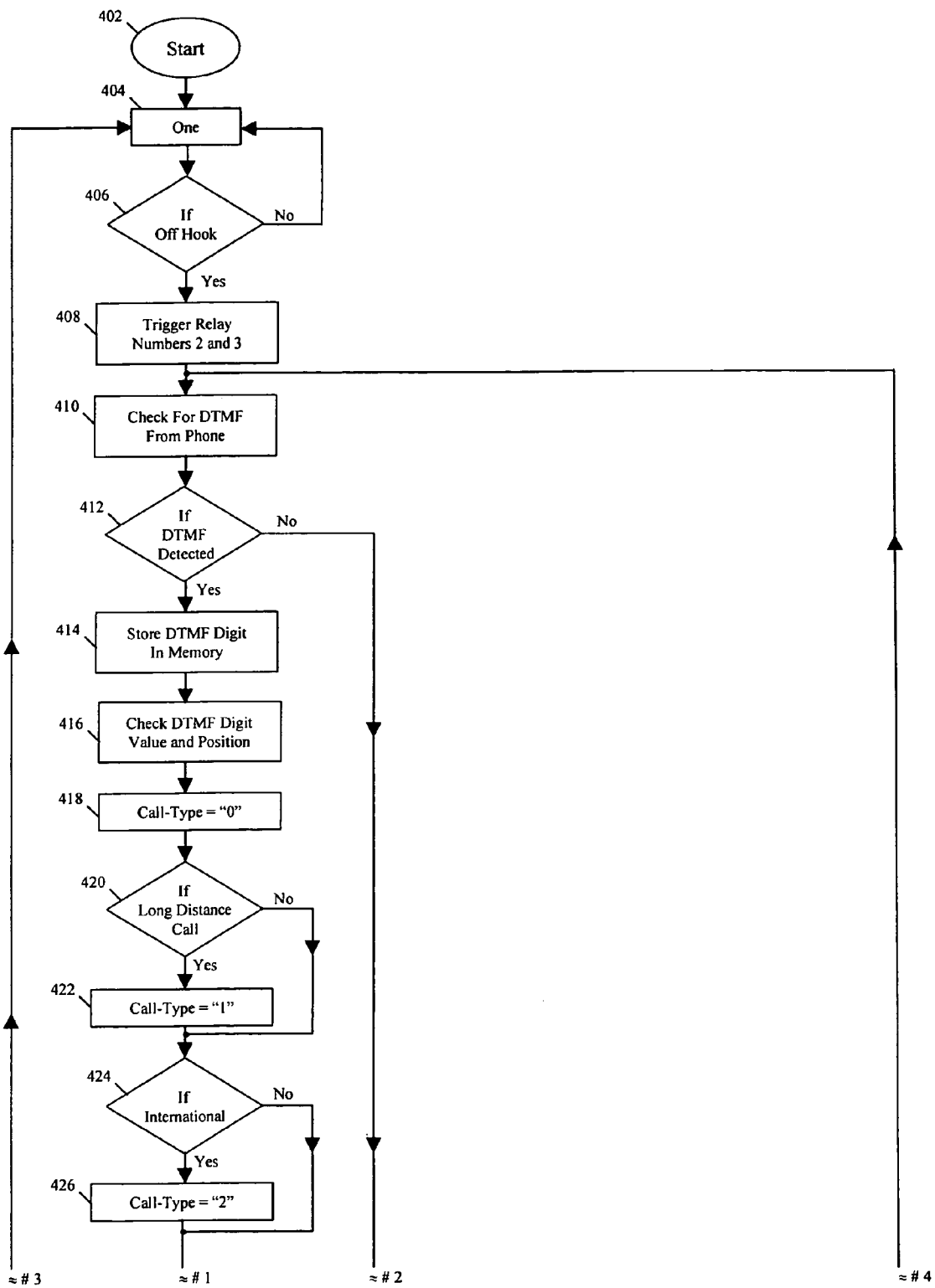
FIGS. 4A and 4B are flowcharts showing an alternate embodiment of the telephone line monitoring, discount call detection and call completion process performed by the router shown in FIG. 2.
Figure 4B:
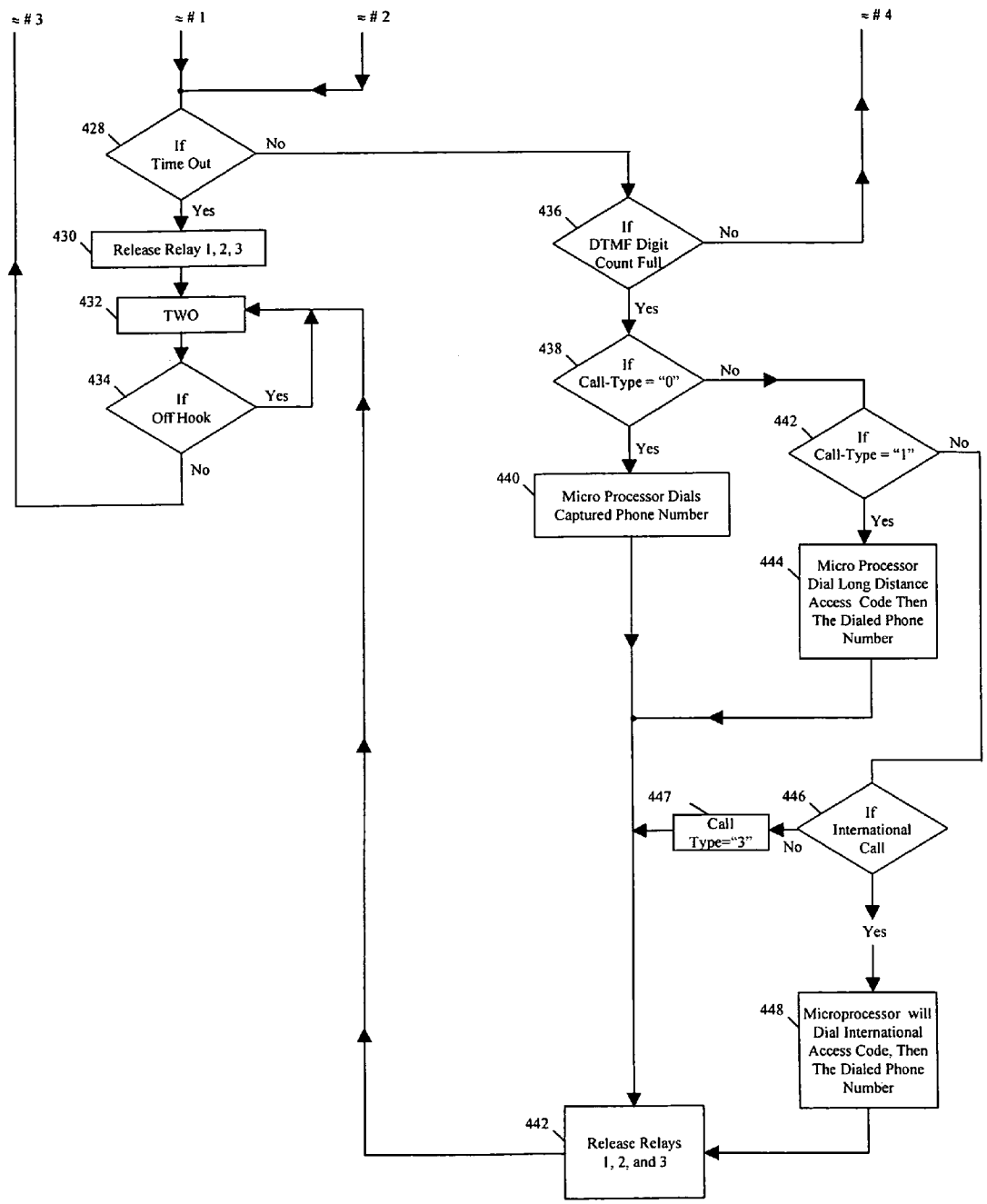

FIGS. 3A and 3B illustrate an embodiment of the present invention for primarily making long distance calls recognizing that the process may include dialing international and local calls. The process described with respect to FIGS. 4A and 4B illustrate an alternate process of effectuating discount long distance and international calls.

In step 402, the process is initiated. In step 406, the router 120 determines whether the telephone 110 is in an off hook condition. If the telephone 110 is experiencing such a condition, relays R2 and R3 are triggered together, isolating the telephone 110 from the outside world. The DTMF decoder 126 monitors whether DTMF signal are detected from the telephone 110 (steps 410 and 412). If DTMF signals are detected, they are stored in memory of the stamp 124 (step 414).

In step 416, the DTMF value and positions are analyzed by the microprocessor. This is done to determine the type of call that is being placed. For example, if the first digit is a "1", a long distance call (call type=1) is being placed. If the first digits are "011", an international call (call type=2) is being placed. If the first digits are "*69", "1800", "1888", or some other preprogrammed special prefix, then the call is classified under the "other" category (call type=3). Most of the remaining calls are local calls (call type=0). The type of call is determined in steps 418–426.

In step 428, a determination is made as to whether a time-out condition has occurred. As described above, if the appropriate number of digits is not captured (or some other problem occurs) within the parameters of the polling protocol, a time-out occurs, the line is released (i.e., user accesses the outside world and hears the time out message).

If no time-out condition occurs, the automatic router 120 checks to see if the DTMF digit count is full (step 436). If it is not full, the process returns to step 410 and awaits further DTMF tones from the telephone 110.

If the DTMF digit count is full, a determination is made as to whether the call is a local call (call type=0) (step 438), a long distance call (call type=1) (step 442), an international (call type=2) or other (call type=3) type of call (step 446).

This determination is made by analyzing the beginning DTMFs of a dialed telephone number as described in detail above.

If the call is a local call, the microprocessor 124 dials the captured telephone number in step 440 and relays 130 are released (step 442). If the call is a long distance telephone call, microprocessor 124 dials the long distance access code and the dialed telephone number (step 444) and relays 130 are released (step 442). If the call is an international call, the microprocessor 124 dials the international access code and the number dialed (step 448) and then relays 130 are released (step 442). Finally, if the call being placed is not a local, long distance or international call, automatic router 120 treats the call as meeting the "other" category. Accordingly, the microprocessor 124 dials the captured numbers and the relays are released.

The phone line is then monitored for the end of the call (step 432). Once the call has ended the process returns to the beginning (step 402).

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method for automatically routing calls through a discount telephone service, comprising:
   initiating a dialing process on a callers dialing device;
   routing an outgoing call through a discount routing device located at the site of the caller's dialing device;
   wherein said discount routing device operates by passing a first dialed digit of an outgoing call to a communication network to signal that an outgoing call is being be made;
   halting all incoming calls to the dialing device by establishing a busy status between the dialing device and the communication network with the passage of the first dialed digit to said communication network;
   if said first dialed digit is indicative of a non-long distance call, the discount routing device does not effect routing of the outgoing call;
   if said first dialed digit is indicative of a long distance call, the discount routing device will isolate the communication network from the dialing device;
   said discount routing device monitoring the dialing of the outgoing phone number to determine what course of action is to be taken by said discount dialing device with said dialed phone number;
   said discount routing device determining if a dialed phone number is long distance by looking for a predetermined number of digits in a predetermined sequence;
   said discount routing device monitoring the isolated communication network to determine the status and ability of said network to process the call that that is being placed by the user of the dialing device;
   said discount routing device notifying the caller of any problems with the communication system while a dialed long distance call is in the process of being routed to a discount service provider;
   said discount routing device utilizing a listing of area codes to exclude an outgoing phone number from being considered a discountable long distance call;
   accessing a discount telephone service by merging said first dialed digit of said outgoing call with the access number for the discount telephone service provider; and
   dialing the remaining digits of the outgoing call.

2. The method according to claim 1 wherein the determining whether a discountable call is being made is accomplished by determining whether the sequence of the leading dialed digits indicate a non local call.

3. The method according to claim 1 wherein the determining whether an outgoing call is discountable is accomplished by determining whether the digits encoding the area code of the dialed phone number disqualifies the outgoing call as discountable.

4. The method according to claim 1 wherein the determining whether a discountable call is made is accomplished by determining whether a leading dialed digits indicate a special service call or toll free call.

5. The method according to claim 1 further comprising:
   determining whether all of the digits associated with an outgoing call have been collected within an intrinsic predetermined polling period.

6. The method according to claim 1 further comprising:
   using a sensor array to detect a time-out condition when the number of digits associated with an outgoing call has not been collected within a predetermined polling period.

7. The method according to claim 1 further comprising:
   determining whether an access code is required to utilize a discount telephone service provider; and
   providing an access code to the discount telephone service provider when said access code is required.

8. The method according to claim 1 wherein the outgoing call is a long distance call.

9. The method according to claim 1 wherein the outgoing call is an international call.

10. The method according to claim 1 wherein the outgoing call is a local call.

11. The method according to claim 1 wherein said excluded outgoing call is a special service call, toll free call, or a local call that requires an area code.

12. The method according to claim 1 further comprising:
    providing a busy signal to incoming callers during said routing of said outgoing call.

13. The method according to claim 1 further comprising:
    selecting discount service provider access number among a plurality of discount telephone service providers; and
    dialing the selected access number of the associated discount telephone service provider.

14. A method for automatically routing long distance calls through a discount telephone service, comprising:
    using a device located inside of a caller's dialing device, wherein said device operates by:
    using an intrinsic dial tone of a communication network to signal a ready state to the call originator;
    passing the first dialed digit of an outgoing call to a communication network to generate a busy signal that will halt all incoming calls to the dialing device over said network;
    processing the leading digits of the dialed outgoing call to determine if the call is discountable;
    routing the outgoing call normally if said first dialed digits are indicative of a non-long distance call;
    isolating the communication network from the dialing process if said first dialed digits are indicative of a long distance call;

using a sensor array to monitor the state of the communication network while collecting the dialed digits of an outgoing call;
using a sensor array to determine if all of the digits associated with said outgoing call are collected within an intrinsic predetermined time period;
using a sensor array to detect when the communication network is unable to complete the routing of a discount call;
using the sequence of the leading four digits of the outgoing call to determine if the phone number is a discountable long distance call;
using the first digit passed to the communication network as part of the access coding of a discount service provider;
completing the discount routing process by combining the first passed digit to the communication network with the discount service provider access code and the digits of the outgoing call.

15. The method according to claim 13 further comprising:
detecting a time-out condition when the required number of digits associated with an outgoing call have not been collected within a predetermined polling period.

16. The method according to claim 13 further comprising:
isolating an outgoing call dialing device from the communication network while monitoring both the communication network status and the collection of dialed digits in the outgoing call.

17. The method according to claim 13 wherein the potential discount call is a long distance call.

18. The method according to claim 13 wherein the potential discount call is an international call.

19. The method according to claim 13 wherein the potential discount call is a local call.

20. The method according to claim 13 wherein the potential discount call is not a special call, not a toll free call, or not a local call that require an area code.

21. The method according to claim 13 further comprising:
providing a busy signal to incoming call while processing said outgoing call.

22. A system for automatically routing calls through a discount telephone service, comprising:
means for providing an intrinsic dial tone prior to the dialing of the first digit of an outgoing call on a dialing device;
means for the dialing device to pass the first dialed digit to the communication network signaling to occurrence of an outgoing call;
means for generating a busy signal with the first pass digit of the outgoing call to the communication network;
means for signaling to a communication network when an outgoing discount calls is about to be made from a dialing device halting all incoming calls;
means for isolating the dialing device from the communication network using a discount routing device located at the site of the caller;
means for determining if an outgoing call is a discountable call by analyzing a predetermined number of the leading digits of the out call for a predetermined sequence of digits;
means for determining whether outgoing calls process was completed within a predetermined time period using a sensor array in a discount routing device; and
means for dialing both an access number for a discount telephone service provider and the digits corresponding to the outgoing call when said call is determined to be discountable.

23. The system according to claim 21 further comprising:
means for the discount routing device to detect signals from the communication network using one or more sensors in the sensor array.

24. The system according to claim 21 wherein the means for the discount routing device to detect dual tone multi-frequency (DTMF) tones originating from either the dialing device or the communication network while in the process of routing an outgoing call.

25. The system according to claim 21 wherein the means for determining whether an outgoing call is a discountable call is accomplished by determining whether the leading digits associated with a dialed number encodes for a non local or toll free area code.

26. The system according to claim 21 further comprising:
means for determining whether the number of digits associated with the outgoing call have been collected within an intrinsic predetermined polling period defined by the communication network.

27. The system according to claim 25 further comprising:
means for detecting a time-out condition when the number of digits associated with the outgoing call has not been collected within said predetermined polling period.

28. The system according to claim 22 further comprising:
means for determining whether an access code is required to effectuate said routing; and
means for providing said access code to the discount telephone service when said code is required.

29. The system according to claim 21 wherein the potential discount call is a long distance call.

30. The system according to claim 21 wherein the potential discount call is an international call.

31. The system according to claim 21 wherein the potential discount call is a local call.

32. The system according to claim 21 wherein the potential discount call is not a special service call, not a local call that requires an area code, or not a toll free call.

33. The system according to claim 22 further comprising:
means for providing a busy signal to incoming callers during said routing of an outgoing call.

34. The system according to claim 22 further comprising:
means for selecting the access number among a plurality of access numbers for discount telephone providers; and
means for dialing the access number of a selected discount telephone provider.

35. A system for automatically converting an outgoing call into a discounted call, comprising:
means for providing an intrinsic dial tone prior to dialing a first digit of an outgoing call;
means for detecting one or more leading digits associated with the outgoing call, wherein a predetermined number of digits of the outgoing call meets a predetermined sequence indicating a non-local call;
means for passing the first digit of the outgoing call to the communication network while using the first digit of the outgoing call as a signal not to send any inbound calls while converting an outgoing call to a discount telephone call;
means for normally routing the outgoing call if the first dialed digit and a predetermined number of digits in a predetermined order is determined to be indicative of a non-long distance call;
means for isolating the communication network from the dialing process to allow collection of all the digits corresponding to said outgoing call while monitoring the status of the communication network, if the first dialed digit is indicative of a long distance call;

means for determining whether all numbers associated with said outgoing call have been collected within an intrinsic predetermined polling period; and means for merging and dialing remaining digits of an access number for a discount telephone service provider and the numbers associated with said outgoing call.

36. The system according to claim 34 further comprising:
means for detecting an intrinsic time-out condition that occurs when all of the digits associated with an outgoing call are not collected within a predetermined polling period using a sensor array.

37. The system according to claim 34 further comprising:
means for determining whether an access code is required to effectuate routing of an outgoing call to a discount service provider; and
means for transmitting said access code to a discount telephone service provider when an access code is required.

38. The system according to claim 34 wherein the potential discount call is a long distance call.

39. The system according to claim 34 wherein the potential discount call is an international.

40. The system according to claim 34 wherein the potential discount call is a local call.

41. The system according to claim 34 wherein the potential discount call is not a special call or a call with a specific area code.

42. The system according to claim 34 further comprising:
means for providing a busy signal to incoming callers during the determination of outgoing call potential discounting, and routing of said call to a discount service provider.

43. A system for automatically routing calls through a discount telephone service provider, comprising:
a discount call routing device located at the site of the caller's dialing device, said device containing a dual tone multi frequency (DTMF) tones decoder configured for identifying dialed digits associated with an outgoing telephone call;
said discount call routing device configured to pass the first dialed digit of the outgoing call through to a communication network, wherein creating a signal that halts all inbound calls during a routing processed and initiating a busy signal;
at least one processor with memory configured to monitor the status of the communication network while capturing and analyzing the dialed digits associated with the outgoing telephone call for determining whether a potential discount call is being made, wherein said processors is further configured to determine if leading dialed digits of the outgoing telephone call encode an area of a non-discountable telephone number;
said at least one processor with memory configured to monitor the status of the communication network while capturing and analyzing the dialed digits associated with the outgoing telephone call for determining whether a potential discount call is being made, wherein said processors is further configured to determine if leading dialed digits of the outgoing telephone call encode an area of a discountable telephone number;
said at least one processor with memory configured for collecting and re-arranging the digits associated with the outgoing telephone call and the discount service provider access number, wherein said system is able to use a first dialed digit as part of an access number for a discount service provider;
said at least one processor with memory configured to dial the merged digits of the of the discount service provider access code and the outgoing discountable call with the signal to communication network that halted all incoming calls.

44. The system according to claim 42 wherein the discount routing device is located inside of the caller's dialing device.

45. The system according to claim 43 wherein the predetermined sequence of digits in a predetermined order is associated with a non-local area code component in the outgoing call.

46. The system according to claim 43 wherein the digit associated with the number one is located in the leading position of the dialed phone number and it is passed through to the communication network.

47. The system according to claim 43 wherein the processor is further configured for determining whether the required number of digits associated with an outgoing call have been collected within an intrinsic predetermined polling period using a sensor array.

48. The system according to claim 46 further comprising:
a sensor array consisting of two or more sensors configured for detecting a time-out condition when the number of DTMF signals associated with an outgoing call has not been collected within said polling period.

49. The system according to claim 43 wherein the processor is further configured for determining whether an access code is required to effectuate said routing, and for transmitting said access code stored in memory to the discount telephone service provider when said access code is required.

50. The system according to claim 42 wherein the potential discount call is a long distance call.

51. The system according to claim 42 wherein the potential discount call is an international call.

52. The system according to claim 42 wherein the potential discount call is a local call.

53. The system according to claim 42 wherein the potential discount call is not a local call that requires an area code, or toll free call.

54. The system according to claim 43 further comprising:
relays configured for generating a busy signal to incoming callers throughout the routing of said discount call.

55. The system according to claim 43 wherein the processor is further configured for choosing an access number from among a plurality of access numbers for discount service provider, and for dialing the selected access number is effectuated by a plurality of tones generated by the DTMF tone generator.

56. A system for automatically routing outgoing telephone calls through a discount telephone service, comprising:
a discount call routing device located at the site of a caller's dialing device, said discount call routing device further comprising;
a sensor array configured for monitoring a telephone line for an outgoing telephone call and status of a connection to a communication network, wherein said sensor array can detect two or more different events in said communication network;
a dual tone multi-frequency (DTMF) transceiver configured for detecting all DTMF tones associated with dialed digits of the outgoing telephone call, said system further configured to allow a first digit of the outgoing telephone call to pass to the communication network, and to isolate the communication network from a dialing process if said first digit of the outgoing call is determined be indicative of a long distance call or to normally route the outgoing call if said first digit of the outgoing call is determined to be indicative of a non-long distance call;

at least one processor configured for determining whether the outgoing telephone call is a discountable call by determining whether a predetermined number of dialed digits comprises a sequence of digits "coded" for a non-local area code, said processors further configured for determining whether all the dialed digits associated with the outgoing telephone call have been collected within a predetermined polling period;

said at least one processor further configured to detect and pass on to the call originator the communication network intrinsic dial tone indicating the ready to use status of the dialing device;

said at least one processor further configured to signal the communication network to halt incoming calls while processing a discount call; and said discount routing device able to merge the dialed digit passed to the communication network with digits of an access number for the discount service provider and digits of the dialed outgoing telephone number.

57. The system according to claim 55 further comprising:
an array of sensors of which one is configured for detecting a time-out condition when all of the DTMF tones associated with the outgoing call have not been collected within a predetermined polling period.

58. The system according to claim 56 wherein the processor is further configured for detecting signal over the phone line indicating the need for supplying an access code to the discount service provider, and for transmitting said access code over the telephone line.

59. The system according to claim 55 wherein the discount call is a long distance call.

60. The system according to claim 55 wherein the discount call is an international call.

61. The system according to claim 55 wherein the discount call is a local.

62. The system according to claim 55 wherein the discount call is not a special type call, not a local call dialed with an area code, or not a toll free call.

63. The system according to claim 55 further comprising:
relays configuration configured for generating a busy signal to incoming callers during said routing of said outgoing call.

64. A telephone comprising the automatic call routing system of claim 62.

65. A telephone comprising the automatic call routing system of claim 55.

66. Computer executable software code stored on a computer readable medium, said computer executable software code for automatically routing calls through a discount telephone service, comprising:
code for routing calls to a discount telephone service provider being stored in a device situated at the site of a caller's dialing device, said device further comprising;
code for using an intrinsic dial tone as a ready-to-use indicator;
code for passing a first detected dialed digit of an outgoing telephone call to a communication network as a signal instructing the communication network to halt all inbound calls during a routing process;
code for isolating the communication network from a dialing process if said first detected dialed digit of the outgoing call is determined be indicative of a long distance call;
code for normally routing the outgoing telephone call if said first detected dialed digit and analysis of the leading dialed digits coded an area code that is determined to be indicative of a non-long distance call;
code for determining whether an outgoing telephone call area code indicates it is a non-local call;
code for monitoring status of the communication network connection to the caller's dialing device while the outgoing call is being prepared for routing to the discount service provider;
code for collecting the digits associated with outgoing call; and
code for dialing an access number for a discount telephone service provider using the halt signal to the communication network and the captured digits of the outgoing call.

67. A computer readable medium having computer executable software code stored thereon, the code for automatically routing calls through a discount telephone service, comprising:
code for routing calls to discount service providers being stored in a caller's dialing device;
code for providing an intrinsic dial tone to the caller as a ready indicator;
code for passing a first dialed digit associated with an outgoing telephone call to a communication network signaling to the communication network to halt all inbound calls, and generating a busy signal;
code for isolating the communication network from a dialing process if said first dialed digit associated with the outgoing telephone call is determined to be indicative of a long distance call;
code for normally routing the outgoing telephone call if outgoing call is determined to by non-discountable by analysis of leading dialed digits;
code for determining whether an outgoing call is a discount call based on the area code of the outgoing call;
code for collecting all digits corresponding to the outgoing call;
code for merging an access code of a discount service provider and the first dialed digit that is passed to the communication network;
code for routing the outgoing call by dialing the access number of a discount service provider using the digit passed to the communication network and the digits corresponding to the outgoing call.

68. A programmed computer for automatically routing calls through a discount telephone service, comprising
said programmed computer being situated at the site of a caller's dialing device;
a memory having at least one region for storing a computer executable program code;
at least one processor for executing said computer executable program code, wherein the computer executable program code includes:
code for providing an the intrinsic dial tone of the communication network to the caller;
code for passing a first dialed digit associated with an outgoing telephone call to a communication network signaling to the communication network to halt all inbound calls, and generating a busy signal;

code for isolating the communication network from a dialing process if said first dialed digit is determined to be indicative of a long distance call;

code for normally routing the outgoing telephone call if said first detected dialed digit and analysis of the leading dialed digits that coded the area code is determined to be indicative of a non-long distance call;

code for determining whether the outgoing call is a discount call;

code for collecting all digits corresponding to the outgoing call;

code for intermixing remaining digits of an access code of a discount service provider, and the digits corresponding to the outgoing call; and code for dialing the intermixed remaining digits of the access code of the discount service provider and the digits corresponding to the outgoing call.

69. Computer executable software code stored on a computer readable medium, the code for automatically routing calls through a discount telephone service, comprising:

said computer executable software code being stored in a discount routing device located in a caller's dialing device;

code for providing an intrinsic dial tone to indicate a ready state;

code for monitoring telephone circuitry for an outgoing call;

code for passing a first dialed digit to a communication network signaling the communication network not to pass any inbound calls to the caller's dialing device while a dialed outgoing telephone number is being evaluated;

code for isolating the communication network from a dialing process if said first dialed digit is indicative of a long distance call;

code for normally routing the outgoing telephone call if a predetermined number of the first dialed digits are determined to be indicative of a non-long distance call;

code for determining whether an outgoing call is a potential discount call;

code for detecting DTMF tones corresponding to the leading digits of an outgoing call, wherein determining whether the outgoing call is a potential discount call is accomplished by determining whether the first predetermined number of digits meet a predetermined sequence of digits;

code for collecting a plurality of digits corresponding to the potential discount call;

code for determining whether all of the numbers associated with the potential discount call have been collected within an intrinsic predetermined polling period;

code for dialing remaining numbers of an access number for a discount telephone service provider and the digits corresponding to the potential discount call; and code for notifying the caller if a time-out event occurs.

70. A computer readable medium having computer executable software code stored thereon, the code for automatically routing calls through a discount telephone service, comprising:

computer executable software code for routing calls to discount service providers being stored in a discount routing device located at the site of a caller's dialing device;

code for passing a first predetermined number of dialed digits through to a communication network when an outgoing call is made;

code for normally routing the outgoing telephone call if said first dialed digits are determined to be indicative of a non-long distance call;

code for isolating and monitoring the state of the communication network to determine whether a time-out event has occurred while the process of routing of an outgoing call to a discount service provider;

code for signaling to the communication network that an outgoing call is about to be placed and not to forward any inbound calls;

code for detecting a predetermined number of digits in a predetermined sequence to determine whether the outgoing call is a potential discount call;

code for determining whether the outgoing call is a discountable call;

code for collecting digits associated with the outgoing call;

code for determining whether all of the digits corresponding to the outgoing call have been collected within a predetermined polling period;

code for incorporating the signaling to the communication network into the dialing process for accessing the discount telephone service provider;

code for dialing digits of the outgoing call; and code for notifying the caller if a time-out event is detected during the process of routing the outgoing call.

71. A programmed computer for automatically routing calls through a discount telephone service, comprising;

a programmed computer in the caller's dialing device;

a sensory array able to detect the status of the connection between a caller's dialing device and the communication network;

a memory having at least one region for storing a computer executable program code;

one or more processors for executing the program code stored in the memory, wherein the program includes:

code for passing the dial tone from the communication network to user of the dialing device;

code for determining whether an outgoing call is a discount call while monitoring the status of the communication network;

code for determining whether the leading digits of the outgoing call correspond to a predetermined sequence of numbers that encode the area code of an outgoing call, wherein determining whether said call is a discountable call is accomplished by determining whether the area code is for a non-local call;

code for passing a first predetermined number of dialed digits through to a communication network when an outgoing call is made;

code for normally routing the outgoing telephone call if said first dialed digit is determined to be indicative of a non-long distance call;

code for isolating the communication network from a dialing process if said first dialed digit is indicative of a long distance call;

code for normally routing the outgoing telephone call if said first dialed digits are determined to be indicative of a local call that requires an area code or a toll free number;

code for determining whether all of the digits associated with the outgoing call have been dialed within a predetermined polling period;

code for notifying said device user if a time-out is detected while the call is being routed to a discount service provider; and code for inserting remaining digits of an access number for a discount telephone service provider between the first digit passed to the communication network and the digits corresponding to the outgoing call.

72. A method for automatically routing calls by a discount telephone service, comprising:

a discount telephone service provider receiving a telephone call from a location where a dialing device is attached to a discount routing device, said discount routing device containing a dual tone multi-frequency (DTMF) decoder/encoder configured for identifying and generating DTMF tones that travel between a telephone and a communication network, said DTMF tones embody an outgoing telephone number and incoming signals from a communication network, passing a first dialed digit associated with the outgoing telephone number as a signal to prevent inbound calls from being connected to the telephone while routing is in progress, normally routing a call when the first dialed digit is indicative of a non-long distance call, isolating the communication network from the telephone if the first dialed digit is indicative of a long distance call, a processor configured for analyzing one or more of the leading DTMF tones to determining whether a potential discount call is being made, the processor configured to monitor the status of the communication network, the processor configured to determine whether all of the DTMF tones associated with the discount call have been entered by the caller within a predetermined time period, a memory configured for collecting the telephone number corresponding to the potential discount call, and a processor configured for dialing the access number for a discount service provider using the signal previously passed to the communication network as part of the access number; and a processor configured to dial the outgoing telephone number.

73. A system for automatically routing calls by a discount telephone service, comprising:

a means for passing a first dialed digit to the communication network as a signal to the communication network to prevent inbound calls from being connected to the phone by establishing a busy signal, a means for normally routing a call if the first dialed digit is indicative of a non-long distance call, a means for isolating the communication network from the telephone if the first dialed digit is indicative of a long distance call, a means for notifying a communication network when a phone is busy preparing to route a call to a discount server provider, a means for monitoring the communication network while determining whether an outgoing call should be routed to a discount service provider, a means for determining if all of the digits of an outgoing call have been dialed within an intrinsic predetermined time period, a means for configuring memory to store signals from the communication network, a means for using the dial tone of a telephone to indicate when the phone is ready to accept an outgoing discount call, a means for configuring memory to store the outgoing phone number, a means for configuring a processor to evaluate the status of the communication network and the collection of digits associated with the outgoing call, a means for generating the dialed digits of an outgoing call; and a means for merging the first dialed digit with the remaining numbers of a discount service provider access number and the dialed digits of the outgoing call.

* * * * *